United States Patent
Zhu et al.

(10) Patent No.: US 9,268,123 B2
(45) Date of Patent: Feb. 23, 2016

(54) OFF-AXIAL THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/571,952

(22) Filed: Dec. 16, 2014

(65) Prior Publication Data

US 2015/0253553 A1    Sep. 10, 2015

(30) Foreign Application Priority Data

Mar. 5, 2014    (CN) .......................... 2014 1 0077861

(51) Int. Cl.
| | |
|---|---|
| *G02B 5/10* | (2006.01) |
| *G02B 17/06* | (2006.01) |
| *G01J 1/42* | (2006.01) |

(52) U.S. Cl.
CPC .............. *G02B 17/0642* (2013.01); *G01J 1/42* (2013.01)

(58) Field of Classification Search
CPC .......... G02B 17/0642; G02B 17/0621; G02B 17/0626; H01L 27/14825; G01J 1/0411; G01J 1/0414; G01J 1/42
USPC ................... 359/850–851, 856–859; 250/216
See application file for complete search history.

(56) References Cited

U.S. PATENT DOCUMENTS

| | | | |
|---|---|---|---|
| 2008/0123205 A1* | 5/2008 | Nakano .............. | G02B 17/0626 359/859 |
| 2010/0271691 A1* | 10/2010 | Sakagami .......... | G02B 17/0642 359/351 |

* cited by examiner

*Primary Examiner* — James Phan
(74) *Attorney, Agent, or Firm* — Novak Druce Connolly Bove + Quigg LLP

(57) ABSTRACT

An off-axial three-mirror optical system with freeform surfaces includes a primary mirror, a secondary mirror, a tertiary mirror, and a detector. The primary mirror is located on an incident light path. The secondary mirror is located on a primary mirror reflecting light path. The tertiary mirror is located on a secondary mirror reflecting light path. The detector is located on a tertiary mirror reflecting light path. Each of the primary mirror, the secondary mirror, and the tertiary mirror is an xy polynomial freeform surface up to the fifth order.

19 Claims, 6 Drawing Sheets

OFF-AXIAL THREE-MIRROR OPTICAL SYSTEM WITH FREEFORM SURFACES

CROSS-REFERENCE TO RELATED APPLICATIONS

This application claims all benefits accruing under 35 U.S.C. §119 from China Patent Application No. 201410077861.X, field on Mar. 5, 2014 in the China Intellectual Property Office, disclosure of which is incorporated herein by reference. The application is also related to copending applications entitled, "DESIGN METHOD OF FREEFORM SURFACE APPLIED TO OPTICAL SYSTEMS", filed on Feb. 6, 2015, with application Ser. No. 14/616,457; "OFF-AXIAL THREE-MIRROR OPTICAL SYSTEM WITH FREEFORM SURFACES", filed on Dec. 16, 2014, with application Ser. No. 14/571,965; "DESIGN METHOD OF OFF-AXIAL THREE-MIRROR OPTICAL SYSTEM WITH FREEFORM SURFACES", filed on Feb. 6, 2015, with application Ser. No. 14/616,463.

BACKGROUND

1. Technical Field

The present disclosure relates to an off-axial three-mirror optical system with freeform surfaces, and particularly to an off-axial three-mirror optical system with freeform surfaces which can achieve small F-number and large field angles.

2. Description of Related Art

Compared with conventional rotationally symmetric surfaces, freeform surfaces have asymmetric surfaces and more degrees of design freedom, which can reduce the aberrations and simplify the structure of the reflective scanning system. Thus, freeform surfaces are often used in off-axial three-mirror optical system.

However, conventional off-axial three-mirror optical systems with freeform surfaces are mainly applied to linear field of view with small field angles and large F-number, but the applications in the field of view with large field angles and small F-number are limited.

Another problem in some related art is the assembling and aligning of the conventional off-axial three-mirror optical systems with freeform surfaces is complicated, for the primary mirror, the secondary mirror, and the tertiary mirror in the conventional off-axial three-mirror optical systems with freeform surfaces are all separate from each other.

What is needed, therefore, is to provide an off-axial three-mirror optical system with freeform surfaces, which can achieve large field angles, small F-number and simple assembling and aligning.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the freeform surface reflective scanning system.

DETAILED DESCRIPTION

The disclosure is illustrated by way of example and not by way of limitation in the figures of the accompanying drawings in which like references indicate similar elements. It should be noted that references to "one" "another" embodiment in this disclosure are not necessarily to the same embodiment, and such references mean at least one.

Figure 1:
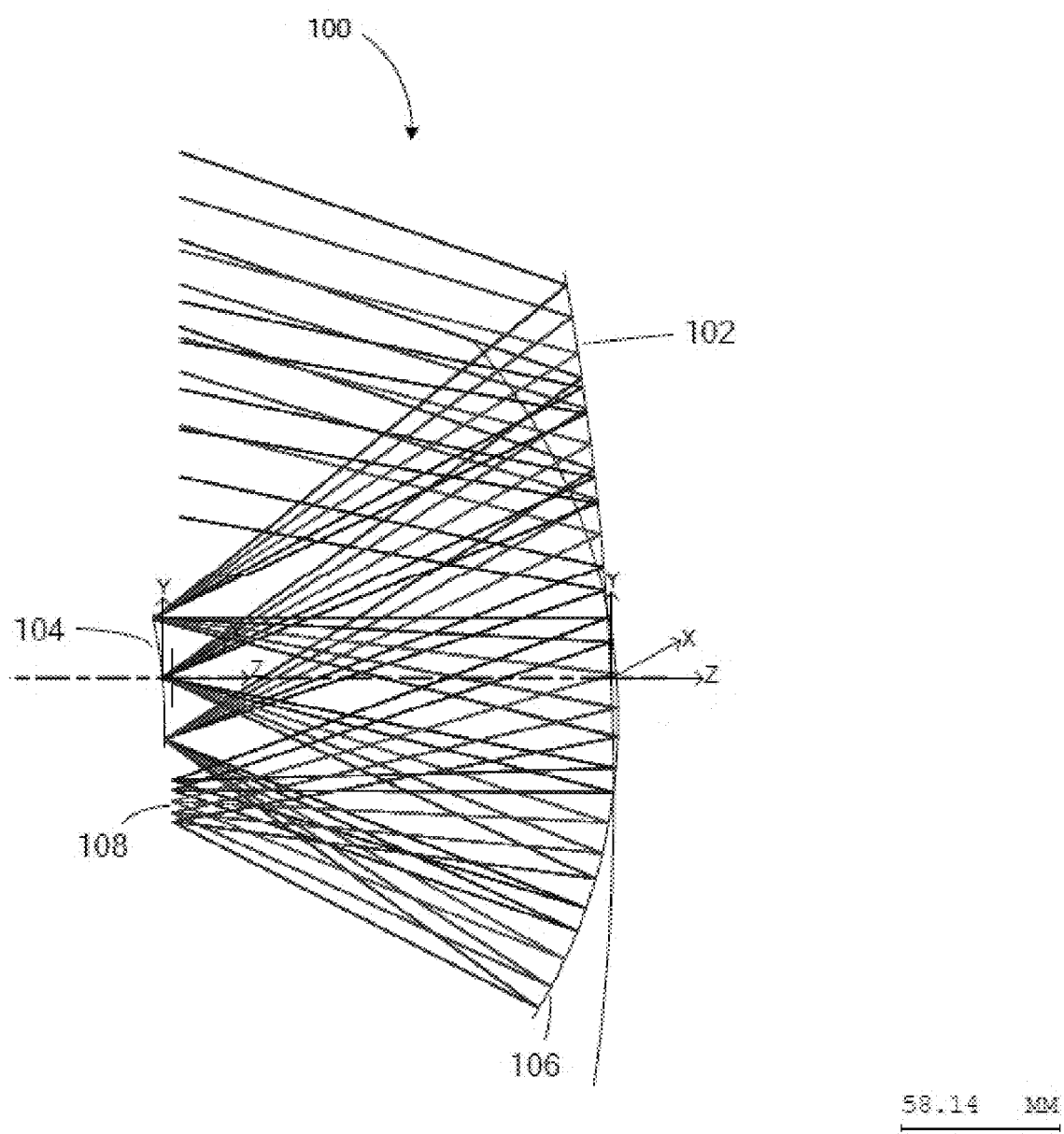
FIG. 1 is a schematic view of an off-axial three-mirror optical system with freeform surfaces configuration according to one embodiment.
Figure 2:
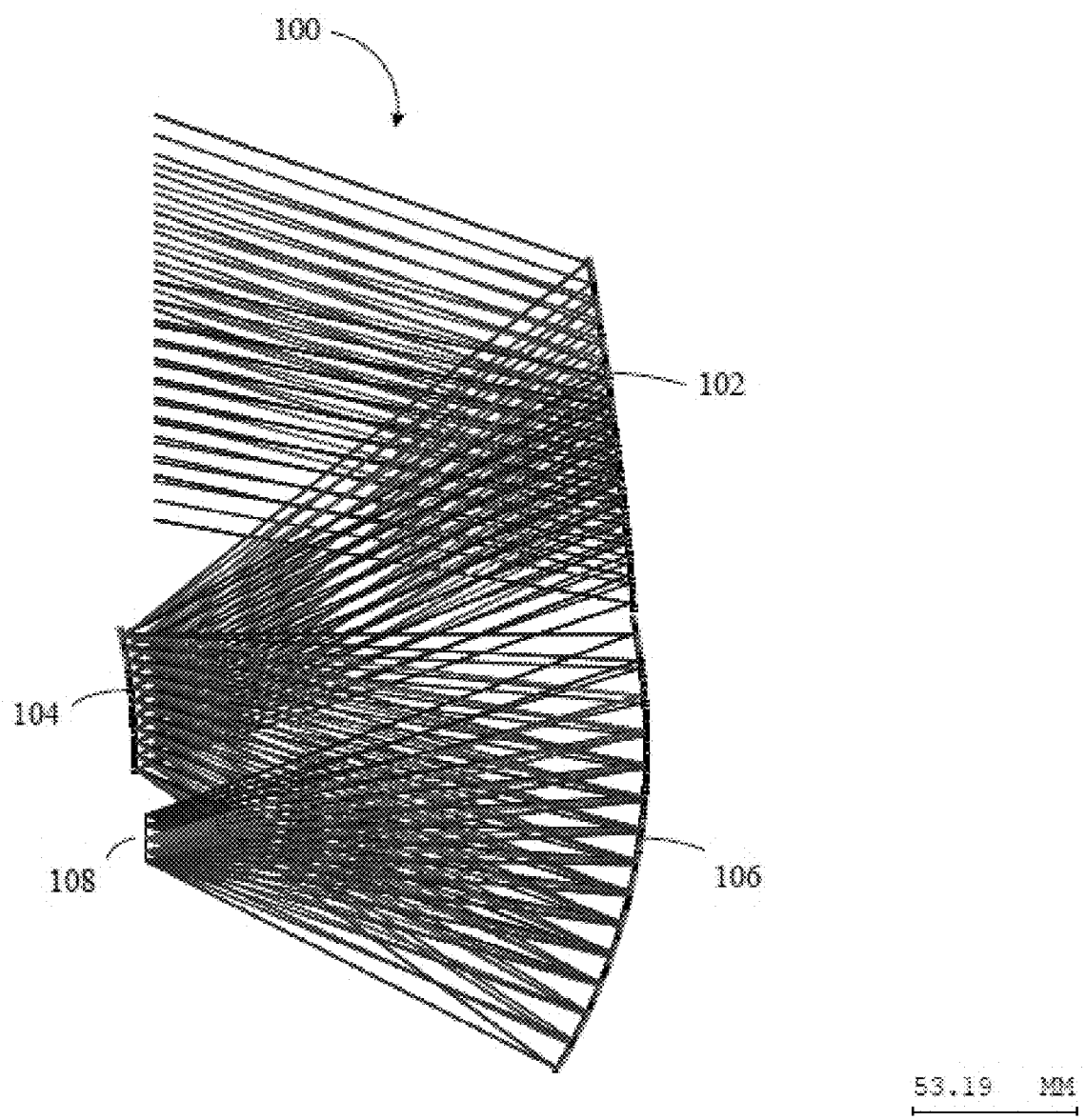
FIG. 2 is a schematic view of an off-axial three-mirror optical system with freeform surfaces light path according to one embodiment.

Referring to FIGS. 1 and 2, an off-axial three-mirror optical system with freeform surfaces 100 of one embodiment is provided. The off-axial three-mirror optical system with freeform surfaces 100 includes a primary mirror 102, a secondary mirror 104, a tertiary mirror 106, and a detector 108. The primary mirror 102 is located on an incident light path; the secondary mirror 104 is located on a reflected light path of the primary mirror 102; the tertiary mirror 106 is located on a reflected light path of the secondary mirror 106; and the detector 108 is located on a reflected light path of the tertiary mirror. Each of a reflecting surface of the primary mirror 102, a reflecting surface of the secondary mirror 104, and a reflecting surface of the tertiary mirror 106 is a freeform surface; and the reflecting surface of the secondary mirror 104 is a stop surface.

A light path of the off-axial three-mirror optical system with freeform surfaces 100 of one embodiment can be depicted as follows. Firstly, an incident light reaches the primary mirror 102, and is reflected by the primary mirror 102 to form a first reflected light $R_1$. Secondly, the first reflected light $R_1$ reaches the secondary mirror 104, and is reflected by the secondary mirror 104 to form a second reflected light $R_2$. Thirdly, the second reflected light $R_2$ reaches the tertiary mirror 106, and is reflected by the tertiary mirror 106 to form a third reflected light $R_3$. Finally, the third reflected light $R_3$ is received by the detector 108.

A first three-dimensional rectangular coordinates system (X,Y,Z) is defined by a location of the primary mirror 102; a second three-dimensional rectangular coordinates system is defined by a location of the secondary mirror 104; and a third three-dimensional rectangular coordinates system is defined by a location of the tertiary mirror 106.

A vertex of the primary mirror 102 is a first three-dimensional rectangular coordinates system (X,Y,Z) origin. A horizontal line passing through the vertex of the primary mirror 102 is defined as a Z-axis; in the Z-axis, to the left is negative, and to the right is positive. A Y-axis is substantially perpendicular to the Z-axis and in a plane shown in FIG. 1; in the Y-axis, to the upward is positive, and to the downward is negative. An X-axis is substantially perpendicular to a YZ plane; in the X-axis, to the inside is positive, and to the outside is negative.

The second three-dimensional rectangular coordinates system is obtained by moving the first three-dimensional rectangular coordinates system (X,Y,Z) about 164.115 mm along a Z-axis negative direction; and a vertex of the secondary mirror 104 is a second three-dimensional rectangular coordinates system origin. The third three-dimensional rectangular coordinates system is obtained by moving the second three-dimensional rectangular coordinates system about 166.115 mm along a Z-axis positive direction; and a vertex of the tertiary mirror 106 is a third three-dimensional rectangular coordinates system origin. In other words, a distance between the first three-dimensional rectangular coordinates system (X,Y,Z) origin and the second three-dimensional rectangular coordinates system origin is about 164.115 mm; and a distance between the second three-dimensional rectangular coordinates system origin and the third three-dimensional rectangular coordinates system origin is about 166.115 mm.

Each of a surface of the primary mirror 102 in the first three-dimensional rectangular coordinates system (X,Y,Z), a surface of the secondary mirror 104 in the second three-dimensional rectangular coordinates system, and a surface of the tertiary mirror 106 in the third three-dimensional rectangular coordinates system is an xy polynomial surface; and an xy polynomial equation can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. Since the off-axial three-mirror optical system with freeform surfaces 100 is symmetrical about a YOZ plane, so even order terms of x can be only remained. At the same time, higher order terms will increase the fabrication difficulty of the off-axial three-mirror optical system with freeform surfaces 100. In one embodiment, each of the surface of the primary mirror 102, the surface of the secondary mirror 104, and the surface of the tertiary mirror 106 is an xy polynomial surface up to the fifth order without odd items of x; and a fifth order xy polynomial equation can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5.$$

In one embodiment, the values of c, k, and $A_i$ in the fifth order xy polynomial equation of the surface of the primary mirror 102, the surface of the secondary mirror 104, and the surface of the tertiary mirror 106 are listed in TABLE 1, TABLE 2 and TABLE 3 respectively. However, the values of c, k, and $A_i$ in the fifth order xy polynomial equation are not limited to TABLE 1, TABLE 2 and TABLE 3.

TABLE 1

| the surface of the primary mirror 102 | |
|---|---|
| c | 0.00001 |
| k | 0 |
| $A_2$ | −4.479404465E−02 |
| $A_3$ | −3.329547026E−04 |
| $A_5$ | −5.089175666E−04 |
| $A_7$ | −2.875421153E−07 |
| $A_9$ | 3.905997414E−07 |
| $A_{10}$ | −9.187067977E−10 |
| $A_{12}$ | −1.386345655E−09 |
| $A_{14}$ | −9.59336907E−10 |

TABLE 1-continued

| the surface of the primary mirror 102 | |
|---|---|
| $A_{16}$ | 3.312490128E−13 |
| $A_{18}$ | 1.068840597E−14 |
| $A_{20}$ | 2.981424695E−15 |

TABLE 2

| the surface of the secondary mirror 104 | |
|---|---|
| c | −0.00560716 |
| k | 3.771722555 |
| $A_2$ | −9.495795402E−02 |
| $A_3$ | 5.206118939E−04 |
| $A_5$ | 8.321411971E−05 |
| $A_7$ | −7.590923035E−06 |
| $A_9$ | −3.672849665E−06 |
| $A_{10}$ | 9.194444332E−09 |
| $A_{12}$ | −1.436477579E−08 |
| $A_{14}$ | −2.518497282E−08 |
| $A_{16}$ | −8.518009935E−10 |
| $A_{18}$ | −1.448729163E−09 |
| $A_{20}$ | −5.742544243E−10 |

TABLE 3

| the surface of the tertiary mirror 106 | |
|---|---|
| c | −0.006942447 |
| k | −0.571866727 |
| A2 | −7.401456903E−02 |
| A3 | 1.109934670E−03 |
| A5 | 1.074553500E−03 |
| A7 | −9.865942866E−07 |
| A9 | −7.966880396E−07 |
| A10 | 2.4670794544E−09 |
| A12 | 4.29670106E−09 |
| A14 | 1.670677609E−09 |
| A16 | −1.728289480E−11 |
| A18 | −3.271768197E−11 |
| A20 | −1.448168246E−11 |

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film.

In one embodiment, the detector 108 is substantially parallel to a third three-dimensional rectangular coordinates system YX plane, and a distance between the detector 108 and the third three-dimensional rectangular coordinates system YX plane is about 162.385 mm.

An effective entrance pupil diameter of the off-axial three-mirror optical system with freeform surfaces 100 is about 64 mm.

All the primary mirror 102, the secondary mirror 104 and the tertiary mirror 106 themselves have no rotation angle, however, all the primary mirror 102, the secondary mirror 104 and the tertiary mirror 106 adopt an off-axis field of view in a Y-axis direction. A field angle of the off-axial three-mirror optical system with freeform surfaces 100 is about 8°×9°, wherein an angle along an X-axis direction is in a range from about −4° to about 4°, and an angle along the Y-axis direction is in a range from about −10° to about −19°.

An effective focal length (EFL) of the off-axial three-mirror optical system with freeform surfaces 100 is about 94.71 mm.

A wavelength of the off-axial three-mirror optical system with freeform surfaces 100 is not limited, in one embodiment, the wavelength of the off-axial three-mirror optical system with freeform surfaces 100 is in a range from about 8 μm to about 12 μm.

A relative aperture (D/f) of the off-axial three-mirror optical system with freeform surfaces 100 is about 0.676; and a F-number of the off-axial three-mirror optical system with freeform surfaces 100 is a relative aperture (D/f) reciprocal, the F-number is about 1.48.

Figure 3:
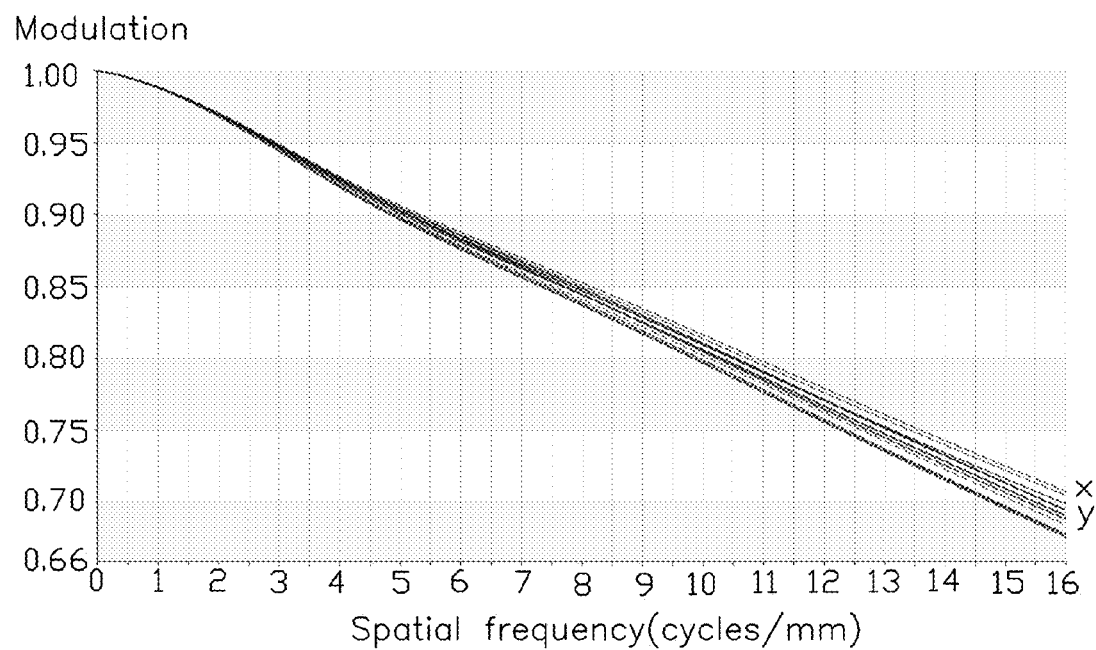
FIG. 3 is a graph showing modulation transfer function curves in long-wave infrared band of partial field angles of an off-axial three-mirror optical system with freeform surfaces according to one embodiment.

Referring to FIG. 3, a modulation transfer functions (MTF) in long-wave infrared band of partial field angles of the off-axial three-mirror optical system with freeform surfaces 100 are higher than 0.65. It shows that an imaging quality of the off-axial three-mirror optical system with freeform surfaces 100 is high.

Figure 4:
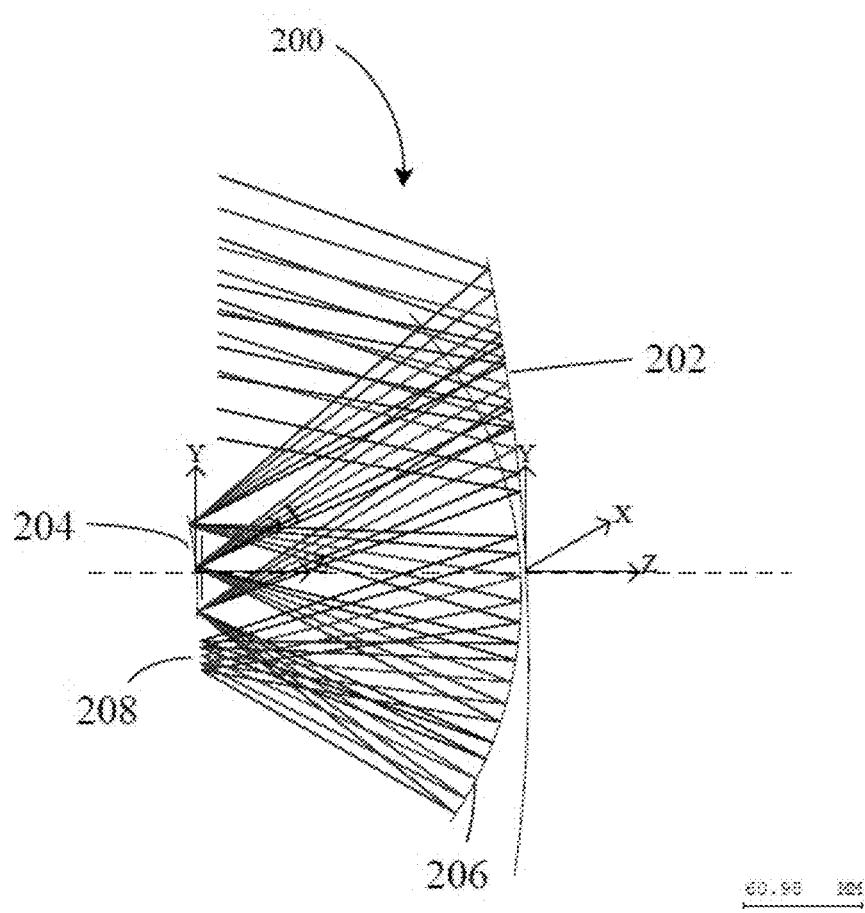
FIG. 4 is a schematic view of an off-axial three-mirror optical system with freeform surfaces configuration according to another embodiment.
Figure 5:
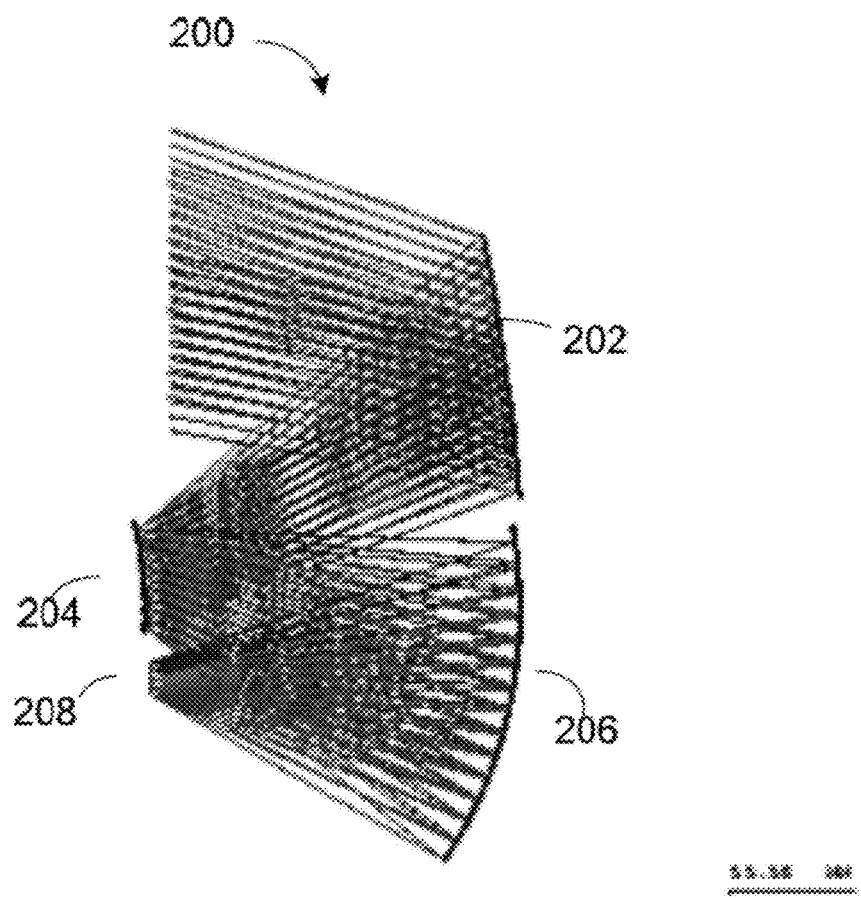
FIG. 5 is a schematic view of an off-axial three-mirror optical system with freeform surfaces light path according to another embodiment.

Referring to FIGS. 4 and 5, an off-axial three-mirror optical system with freeform surfaces 200 of another embodiment is provided. The off-axial three-mirror optical system with freeform surfaces 200 includes a primary mirror 202, a secondary mirror 204, a tertiary mirror 206, and a detector 208. The primary mirror 202 is located on an incident light path; the secondary mirror 204 is located on a reflected light path of the primary mirror 202; the tertiary mirror 206 is located on a reflected light path of the secondary mirror 204; and the detector 208 is located on a reflected light path of the tertiary mirror 206. Each of a reflecting surface of the primary mirror 202, a reflecting surface of the secondary mirror 204, and a reflecting surface of the tertiary mirror 206 is a freeform surface; and the reflecting surface of the secondary mirror 204 is a stop surface.

In another embodiment, a light path of the off-axial three-mirror optical system with freeform surfaces 200 can be depicted as follows. Firstly, an incident light reaches the primary mirror 202, and is reflected by the primary mirror 202 to form a first reflected light $R_1$. Secondly, the first reflected light $R_1$ reaches the secondary mirror 204, and is reflected by the secondary mirror 204 to form a second reflected light $R_2$. Thirdly, the second reflected light $R_2$ reaches the tertiary mirror 206, and is reflected by the tertiary mirror 206 to form a third reflected light $R_3$. Finally, the third reflected light $R_3$ is received by the detector 208.

A first three-dimensional rectangular coordinates system (X,Y,Z) is defined by a location of the primary mirror 202; a fourth three-dimensional rectangular coordinates system is defined by a location of the secondary mirror 204; and a fifth three-dimensional rectangular coordinates system is defined by a location of the tertiary mirror 206.

A vertex of the primary mirror 202 is a first three-dimensional rectangular coordinates system (X,Y,Z) origin. A horizontal line passing through the vertex of the primary mirror 202 is defined as a Z-axis; in the Z-axis, to the left is negative, and to the right is positive. A Y-axis is in a plane shown in FIG. 4; and in the Y-axis, in a direction substantially perpendicular to the Z-axis, to the upward is positive, and to the downward is negative. An X-axis is substantially perpendicular to a YZ plane; and in the X-axis, in a direction substantially perpendicular to the YZ plane, to the inside is positive, and to the outside is negative.

The fourth three-dimensional rectangular coordinates system is obtained by moving the first three-dimensional rectangular coordinates system (X,Y,Z) about 169.524 mm along a Z-axis negative direction; and a vertex of the secondary mirror 204 is a fourth three-dimensional rectangular coordinates system (X,Y,Z) origin. The fifth three-dimensional rectangular coordinates system is obtained by moving the fourth three-dimensional rectangular coordinates system about 166.524 mm along a Z-axis positive direction; and a vertex of the tertiary mirror 206 is a fifth three-dimensional rectangular coordinates system origin. In other words, a distance between the first three-dimensional rectangular coordinates system (X,Y,Z) origin and the fourth three-dimensional rectangular coordinates system origin is about 169.524 mm; and a distance between the fourth three-dimensional rectangular coordinates system origin and the fifth three-dimensional rectangular coordinates system origin is about 166.524 mm.

Each of a surface of the primary mirror 202 in the first three-dimensional rectangular coordinates system (X,Y,Z), a surface of the secondary mirror 204 in the fourth three-dimensional rectangular coordinates system, and a surface of the tertiary mirror 206 in the fifth three-dimensional rectangular coordinates system is an xy polynomial surface, and an xy polynomial equation can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. In another embodiment, each of the surface of the primary mirror 202, the surface of the secondary mirror 204, and the surface of the tertiary mirror 206 is an xy polynomial surface up to the fifth order without odd items of x, and a fifth order xy polynomial equation can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5.$$

In another embodiment, the values of c, k, and $A_i$ in the fifth order xy polynomial equation of the surface of the primary mirror 202, the surface of the secondary mirror 204, and the surface of the tertiary mirror 206 are listed in TABLE 1, TABLE 2 and TABLE 3 respectively. However, the values of c, k, and $A_i$ in the fifth order xy polynomial equation are not limited to TABLE 4, TABLE 5 and TABLE 6.

TABLE 4

| the surface of the primary mirror 202 | |
|---|---|
| c | 0 |
| k | 0 |
| $A_2$ | −5.364677289E−02 |
| $A_3$ | −2.802389614E−04 |
| $A_5$ | −4.917279604E−04 |
| $A_7$ | −2.743858983E−07 |
| $A_9$ | 3.731785913E−07 |
| $A_{10}$ | −8.176179189E−10 |
| $A_{12}$ | −1.230682638E−09 |
| $A_{14}$ | −8.892692680E−10 |
| $A_{16}$ | 6.549420181E−35 |
| $A_{18}$ | 5.584623337E−34 |
| $A_{20}$ | 0 |

TABLE 5 the surface of the secondary mirror 204

| | |
|---|---|
| c | −0.00544243 |
| k | 3.600757791 |
| $A_2$ | −9.014206275E−02 |
| $A_3$ | 5.974521478E−04 |
| $A_5$ | 3.781771968E−05 |
| $A_7$ | −6.538853200E−06 |
| $A_9$ | −2.999353070E−06 |
| $A_{10}$ | 6.461501718E−09 |
| $A_{12}$ | −2.122881499E−08 |
| $A_{14}$ | −3.237190787E−08 |
| $A_{16}$ | −6.611697570E−10 |
| $A_{18}$ | −1.127245302E−09 |
| $A_{20}$ | −4.249403507E−10 |

TABLE 6 the surface of the tertiary mirror 206

| | |
|---|---|
| c | −0.005299011 |
| k | −0.192915447 |
| $A_2$ | −6.673790345E−02 |
| $A_3$ | 3.181341995E−04 |
| $A_5$ | 2.685200967E−04 |
| $A_7$ | −8.674466513E−07 |
| $A_9$ | −6.837474152E−07 |
| $A_{10}$ | 8.911014429E−11 |
| $A_{12}$ | −4.855329097E−10 |
| $A_{14}$ | −6.382272150E−10 |
| $A_{16}$ | −1.294202378E−11 |
| $A_{18}$ | −2.407155556E−11 |
| $A_{20}$ | −9.626719602E−12 |

The materials of the primary mirror 202, the secondary mirror 204 and the tertiary mirror 206 can be aluminum, beryllium or other metals. The materials of the primary mirror 202, the secondary mirror 204 and the tertiary mirror 206 can also be silicon carbide, quartz or other inorganic materials. A reflection enhancing coating can also be coated on the metals or inorganic materials to enhance the reflectivity performance of the three mirrors. In another embodiment, the reflection enhancing coating is a gold film.

In another embodiment, the detector 208 is substantially parallel to a fifth three-dimensional rectangular coordinates system YX plane, and a distance between the detector 208 and the fifth three-dimensional rectangular coordinates system YX plane is about 163.657 mm.

An effective entrance pupil diameter of the off-axial three-mirror optical system with freeform surfaces 200 is about 64 mm.

All the primary mirror 202, the secondary mirror 204 and the tertiary mirror 206 themselves have no rotation angle, however, all the primary mirror 202, the secondary mirror 204 and the tertiary mirror 206 adopt an off-axis field of view in a Y-axis direction. A field angle of the off-axial three-mirror optical system with freeform surfaces 200 is about 8°×9°, wherein an angle along an X-axis direction is in a range from about −4° to about 4°, and an angle along the Y-axis direction is in a range from about −10° to about −19°.

An effective focal length (EFL) of the off-axial three-mirror optical system with freeform surfaces 200 is about 94.71 mm.

A wavelength of the off-axial three-mirror optical system with freeform surfaces 200 is not limited, in one embodiment, the wavelength of the off-axial three-mirror optical system with freeform surfaces 200 is in a range from about 8 μm to about 12 μm.

A relative aperture (D/f) of the off-axial three-mirror optical system with freeform surfaces 200 is about 0.676; and a F-number of the off-axial three-mirror optical system with freeform surfaces 200 is a relative aperture (D/f) reciprocal, the F-number is about 1.48.

Figure 6:
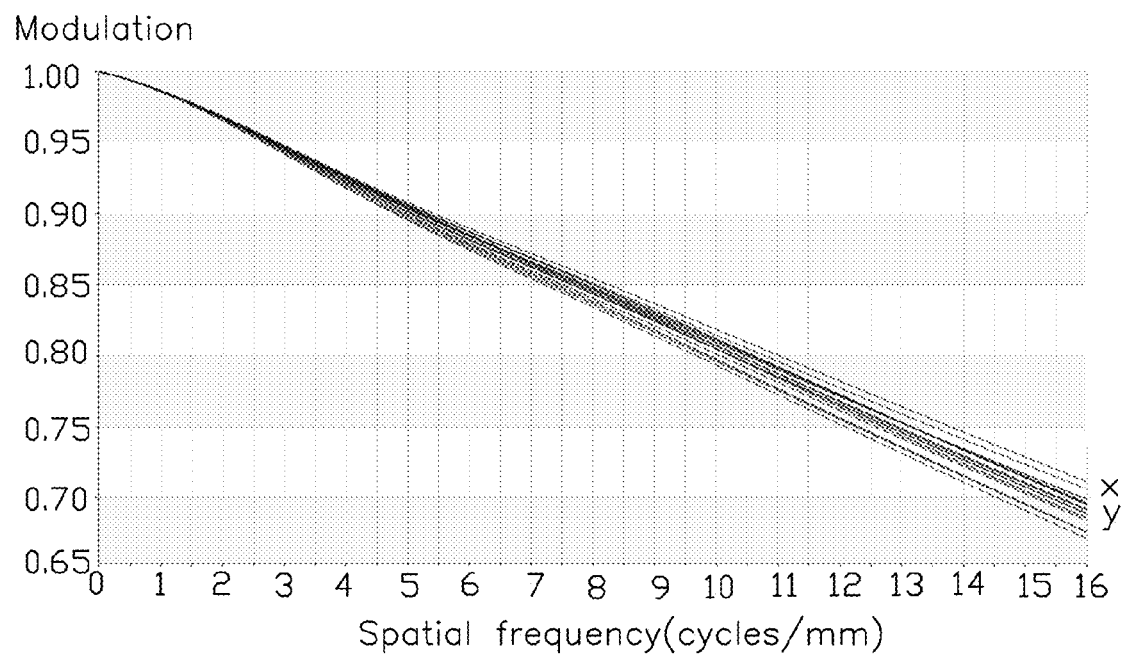
FIG. 6 is a graph showing modulation transfer function curves in long-wave infrared band of partial field angles of an off-axial three-mirror optical system with freeform surfaces according to another embodiment.

Referring to FIG. 6, a modulation transfer functions (MTF) in long-wave infrared band of partial field angles of the off-axial three-mirror optical system with freeform surfaces 200 are higher than 0.65. It shows that an imaging quality of the off-axial three-mirror optical system with freeform surfaces 200 is high.

Compared with a coaxial three-mirror optical system, the off-axial three-mirror optical system with freeform surfaces 100 and the off-axial three-mirror optical system with freeform surfaces 200 can have many advantages.

The off-axial three-mirror optical system with freeform surfaces 100 and the off-axial three-mirror optical system with freeform surfaces 200 have larger field angle, thereby enabling the off-axial three-mirror optical system with freeform surfaces 100 and the off-axial three-mirror optical system with freeform surfaces 200 have larger field of view, and larger imaging range.

A primary mirror surface, a secondary mirror surface and a tertiary mirror surface are all a freeform surface, compared with spherical or aspherical system, the off-axial three-mirror optical system with freeform surfaces 100 and the off-axial three-mirror optical system with freeform surfaces 200 have more variables that can be controlled, which is conducive to correct aberrations, and obtain better imaging quality.

The off-axial three-mirror optical system with freeform surfaces 100 and the off-axial three-mirror optical system with freeform surfaces 200 have smaller F-number and larger relative aperture, which allows more lights to enter the off-axial three-mirror optical system with freeform surfaces 100 and the off-axial three-mirror optical system with freeform surfaces 200, and enables the off-axial three-mirror optical system with freeform surfaces 100 and the off-axial three-mirror optical system with freeform surfaces 200 have higher input energy and limiting resolution.

A primary mirror position and a tertiary mirror position on the Z-axis is close and continuous approximation, thus, the primary mirror 202 and the tertiary mirror 206 can be performed in the same piece element, which can simplify the processing and alignment of the systems.

The polynomial surface order of the freeform surface mirrors in the off-axial three-mirror optical system with freeform surfaces 100 and the off-axial three-mirror optical system with freeform surfaces 200 are low, which makes the off-axial three-mirror optical system with freeform surfaces 100 and the off-axial three-mirror optical system with freeform surfaces 200 are easier to be assembled and fabricated.

The above-described contents are detailed illustrations with specific and preferred embodiments for the present disclosure. It cannot be considered that the implementation of the present disclosure is limited to these illustrations. For one of ordinary skill in the art, variations and equivalents having the same effects and applications can be made without departing from the spirit of the present disclosure and should be seen as being belonged to the scope of the present disclosure.

What is claimed is:

1. An off-axial three-mirror optical system with freeform surfaces comprising:
a primary mirror located on an incident light path, and configured to reflect an incident light to form a first reflected light; and a first three-dimensional rectangular coordinates system (X,Y,Z) is defined by a primary mirror vertex as a first origin;

a secondary mirror located on a first reflected light path, and configured to reflect the first reflected light to form a second reflected light; a secondary mirror reflecting surface is a stop surface; and a second three-dimensional rectangular coordinates system is defined by a secondary mirror vertex as a second origin; and the second three-dimensional rectangular coordinates system is obtained by moving the first three-dimensional rectangular coordinates system (X,Y,Z) along a Z-axis negative direction;

a tertiary mirror located on a second reflected light path, and configured to reflect the second reflected light to form a third reflected light; a third three-dimensional rectangular coordinates system is defined by a tertiary mirror vertex as a third origin; and the third three-dimensional rectangular coordinates system is obtained by moving the second three-dimensional rectangular coordinates system along a-Z-axis positive direction; and a detector is located on a third reflected light path and configured to receive the third reflected light;

wherein a primary mirror surface is an xy polynomial surface up to the fifth order in the first three-dimensional rectangular coordinates system (X,Y,Z); a secondary mirror surface is an xy polynomial surface up to the fifth order in the second three-dimensional rectangular coordinates system; and a tertiary mirror surface is an xy polynomial surface up to the fifth order in the third three-dimensional rectangular coordinates system.

2. The system as claimed in claim 1, wherein an xy polynomial surface equation is $$z(x,y) = \frac{c(x^2+y^2)}{1+\sqrt{1-(1+k)c^2(x^2+y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5,$$

wherein, z represents surface vector high, c represents surface curvature, k represents conic constant, and $A_2 \sim A_{20}$ represents represent coefficients.

3. The system as claimed in claim 2, wherein the second three-dimensional rectangular coordinates system is obtained by moving the first three-dimensional rectangular coordinates system (X,Y,Z) about 164.115 mm along the Z-axis negative direction; and the third three-dimensional rectangular coordinates system is obtained by moving the second three-dimensional rectangular coordinates system about 166.115 mm along the Z-axis positive direction.

4. The system as claimed in claim 3, wherein in a primary mirror surface equation, c=0.00001, k=0, $A_2$=−4.479404465E-02, $A_3$=−3.329547026E-04, $A_5$=−5.089175666E-04, $A_7$=−2.875421153E-07, $A_9$=3.905997414E-07, $A_{10}$=−9.187067977E-10, $A_{12}$=−1.386345655E-09, $A_{14}$=−9.595336907E-10, $A_{16}$=3.312490128E-13, $A_{18}$=1.068840597E-14, and $A_{20}$=2.981424695E-15.

5. The system as claimed in claim 3, wherein in a secondary mirror surface equation, c=−0.00560716, k=3.771722555, $A_2$=−9.495795402E-02, $A_3$=5.206118939E-04, $A_5$=8.321411971E-05, $A_7$=−7.590923035E-06, $A_9$=−3.672849665E-06, $A_{10}$=9.194444332E-09, $A_{12}$=−1.436477579E-08, $A_{14}$=−2.518497282E-08, $A_{16}$=−8.518009935E-10, $A_{18}$=−1.448729163E-09, and $A_{20}$=−5.742544243E-10.

6. The system as claimed in claim 3, wherein in a tertiary mirror surface equation, c=−0.006942447, k=−0.571866727, $A_2$=−7.401456903E-02, $A_3$=1.109934670E-03, $A_5$=1.074553500E-03, $A_7$=−9.865942866E-07, $A_9$=−7.966880396E-07, $A_{10}$=2.467079544E-09, $A_{12}$=4.292670106E-09, $A_{14}$=1.670677609E-09, $A_{16}$=−1.728289480E-11, $A_{18}$=−3.271768197E-11, and $A_{20}$=−1.448168246E-11.

7. The system as claimed in claim 3, wherein a distance between the detector and a third three-dimensional rectangular coordinates system YX plane is about 162.385 mm.

8. The system as claimed in claim 3, wherein an off-axial three-mirror optical system with freeform surfaces effective entrance pupil diameter is about 64 mm.

9. The system as claimed in claim 3, wherein an off-axial three-mirror optical system with freeform surfaces field angle is about 8°×9°.

10. The system as claimed in claim 9, wherein an angle along an X-axis direction is in a range from about −4° to about 4°.

11. The system as claimed in claim 9, wherein an angle along a Y-axis direction is in a range from about −10° to about −19°.

12. The system as claimed in claim 3, wherein an off-axial three-mirror optical system with freeform surfaces relative aperture is about 0.676; and an off-axial three-mirror optical system with freeform surfaces F-number is about 1.48.

13. The system as claimed in claim 3, wherein an off-axial three-mirror optical system with freeform surfaces effective focal length is about 94.71 mm.

14. The system as claimed in claim 2, wherein the second three-dimensional rectangular coordinates system is obtained by moving the first three-dimensional rectangular coordinates system (X,Y,Z) about 169.524 mm along the Z-axis negative direction; and the third three-dimensional rectangular coordinates system is obtained by moving the second three-dimensional rectangular coordinates system about 169.524 mm along the Z-axis positive direction.

15. The system as claimed in claim 14, wherein in a primary mirror surface equation, c=0, k=0, $A_2$=−5.364677289E-02, $A_3$=−2.802389614E-04, $A_5$=−4.917279604E-04, $A_7$=−2.743858983E-07, $A_9$=3.731785913E-07, $A_{10}$=−8.176179189E-10, $A_{12}$=−1.230682638E-09, $A_{14}$=−8.892692680E-10, $A_{16}$=6.549420181E-35, $A_{18}$=5.584623337E-34, and $A_{20}$=0.

16. The system as claimed in claim 14, wherein in a secondary mirror surface equation, c=−0.00544243, k=3.600757791, $A_2$=−9.014206275E-02, $A_3$=5.974521478E-04, $A_5$=3.781771968E-05, $A_7$=−6.538853200E-06, $A_9$=−2.999353070E-06, $A_{10}$=6.461501718E-09, $A_{12}$=−2.122881499E-08, $A_{14}$=−3.237190787E-08, $A_{16}$=−6.611697570E-10, $A_{18}$=−1.127245302E-09, and $A_{20}$=−4.249403507E-10.

17. The system as claimed in claim 14, wherein in a tertiary mirror surface equation, c=−0.005299011, k=−0.192915447, $A_2$=−6.673790345E-02, $A_3$=3.181341995E-04, $A_5$=2.685200967E-04, $A_7$=−8.674466513E-07, $A_9$=−6.837474152E-07, $A_{10}$=8.911014429E-11, $A_{12}$=−4.855329097E-10, $A_{14}$=−6.382272150E-10, $A_{16}$=−1.294202378E-11, $A_{18}$=−2.407155556E-11, and $A_{20}$=−9.626719602E-12.

18. The system as claimed in claim 14, wherein a distance between the detector and a third three-dimensional rectangular coordinates system YX plane is about 163.657 mm.

19. The system as claimed in claim 14, wherein an off-axial three-mirror optical system with freeform surfaces field angle is about 8°×9°.

* * * * *